(12) United States Patent
Phadnis

(10) Patent No.: US 12,314,996 B2
(45) Date of Patent: *May 27, 2025

(54) METHOD, COMPUTER-READABLE MEDIUM, AND SYSTEM FOR MEDIA SUBSCRIPTION PACKAGE MANAGEMENT

(71) Applicant: What's On India Media Private Limited, Mumbai (IN)

(72) Inventor: Atul Phadnis, Mumbai (IN)

(73) Assignee: What's On India Media Private Limited, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,394

(22) Filed: Jul. 29, 2020

(65) Prior Publication Data

US 2021/0012410 A1 Jan. 14, 2021

Related U.S. Application Data

(63) Continuation of application No. 15/111,777, filed as application No. PCT/IN2015/000023 on Jan. 15, 2015, now Pat. No. 10,755,333.

(30) Foreign Application Priority Data

Jan. 15, 2014 (IN) .......................... 140/MUM/2014

(51) Int. Cl.
*G06Q 30/00* (2023.01)
*G06F 16/2457* (2019.01)
(Continued)

(52) U.S. Cl.
CPC ... *G06Q 30/0631* (2013.01); *G06F 16/24578* (2019.01); *G06F 16/9535* (2019.01); *G06Q 30/0641* (2013.01); *G06Q 50/01* (2013.01)

(58) Field of Classification Search
CPC .......... G06Q 30/0631; G06Q 30/0641; G06Q 50/01; G06F 16/24578; G06F 16/9535
(Continued)

(56) References Cited

U.S. PATENT DOCUMENTS 5,319,542 A * 6/1994 King, Jr. ............ G06Q 30/0635
705/26.81
5,534,911 A 7/1996 Levitan
(Continued)

FOREIGN PATENT DOCUMENTS

EP 0755154 1/1997
WO 9901984 1/1999
(Continued)

OTHER PUBLICATIONS

Chorianopoulos, Konstantinos, and Diomidis Spinellis. "User interface development for interactive television: Extending a commercial DTV platform to the virtual channel API." Computers & Graphics 28.2 (2004): 157-166. (Year: 2004).*
(Continued)

*Primary Examiner* — Christopher B Seibert
(74) *Attorney, Agent, or Firm* — MCDONNELL BOEHNEN HULBERT & BERGHOFF LLP

(57) ABSTRACT

A method and system for sale management is disclosed. The method and system enhance a television service provider's ability to sell channels and packs to users. The system and method disclosed herein enables a user to receive recommendations for one or more television channels and/or channel packages based on one or more television viewing activities of the user.

18 Claims, 7 Drawing Sheets

(51) Int. Cl.
  *G06F 16/9535* (2019.01)
  *G06Q 30/0601* (2023.01)
  *G06Q 50/00* (2012.01)

(58) Field of Classification Search
  USPC ..................................................... 705/26.7
  See application file for complete search history.

(56) References Cited

U.S. PATENT DOCUMENTS

| | | | |
|---|---|---|---|
| 5,973,683 A | 10/1999 | Cragun et al. | |
| 6,020,883 A | 2/2000 | Herz et al. | |
| 6,978,273 B1* | 12/2005 | Bonneau | G06Q 30/02 |
| | | | 707/999.102 |
| 7,337,458 B2 | 2/2008 | Michelitsch et al. | |
| 7,433,832 B1* | 10/2008 | Bezos | G06Q 10/10 |
| | | | 705/26.8 |
| 7,725,357 B2 | 5/2010 | Gagnon et al. | |
| 7,778,890 B1* | 8/2010 | Bezos | G06Q 30/0203 |
| | | | 705/26.1 |
| 7,937,725 B1* | 5/2011 | Schaffer | H04N 21/4826 |
| | | | 725/46 |
| 8,275,764 B2 | 9/2012 | Jeon et al. | |
| 8,370,203 B2* | 2/2013 | Dicker | G06Q 30/0603 |
| | | | 705/26.7 |
| 8,549,553 B2 | 10/2013 | Barton et al. | |
| 8,745,047 B2 | 6/2014 | Fein et al. | |
| 9,172,915 B2 | 10/2015 | Nicholas et al. | |
| 9,215,423 B2 | 12/2015 | Kimble et al. | |
| 9,230,212 B2 | 1/2016 | Su | |
| 9,241,136 B2 | 1/2016 | Busse et al. | |
| 9,256,652 B2 | 2/2016 | Korbecki et al. | |
| 9,396,492 B2 | 7/2016 | Schiff et al. | |
| 9,460,092 B2 | 10/2016 | Murphy et al. | |
| 9,473,730 B1 | 10/2016 | Roy et al. | |
| 9,584,868 B2 | 2/2017 | Diaz Perez | |
| 9,654,721 B2 | 5/2017 | Ruiz-Velasco et al. | |
| 9,900,656 B2 | 2/2018 | Phadnis | |
| 2001/0037258 A1* | 11/2001 | Barritz | G06Q 30/06 |
| | | | 715/234 |
| 2001/0037261 A1* | 11/2001 | Ishitsuka | G06Q 30/0635 |
| | | | 705/26.81 |
| 2002/0151327 A1 | 10/2002 | Levitt | |
| 2003/0084450 A1 | 5/2003 | Thurston et al. | |
| 2003/0145326 A1* | 7/2003 | Gutta | H04N 21/4826 |
| | | | 725/46 |
| 2003/0177072 A1* | 9/2003 | Bared | G06Q 30/0623 |
| | | | 705/26.81 |
| 2003/0233425 A1* | 12/2003 | Lyons | H04L 67/02 |
| | | | 709/217 |
| 2004/0044677 A1 | 3/2004 | Huper-Graff et al. | |
| 2004/0133542 A1* | 7/2004 | Doerksen | G06Q 30/0621 |
| 2005/0216304 A1* | 9/2005 | Westphal | G06Q 30/0601 |
| | | | 705/26.1 |
| 2005/0261987 A1 | 11/2005 | Bezos et al. | |
| 2005/0289039 A1* | 12/2005 | Greak | G06Q 40/04 |
| | | | 705/37 |
| 2006/0059260 A1 | 3/2006 | Kelly et al. | |
| 2006/0195362 A1* | 8/2006 | Jacobi | G06Q 30/0277 |
| | | | 705/343 |
| 2006/0206387 A1* | 9/2006 | Peterkofsky | G06Q 10/08 |
| | | | 705/22 |
| 2007/0011702 A1 | 1/2007 | Vaysman | |
| 2007/0019795 A1* | 1/2007 | Thomas | H04L 67/04 |
| | | | 379/88.13 |
| 2007/0124756 A1 | 5/2007 | Covell et al. | |
| 2007/0156589 A1 | 7/2007 | Zimler et al. | |
| 2007/0250863 A1 | 10/2007 | Ferguson | |
| 2007/0276721 A1* | 11/2007 | Jackson | G06Q 30/0253 |
| | | | 705/14.51 |
| 2007/0282693 A1* | 12/2007 | Staib | G06Q 30/0633 |
| | | | 705/26.8 |
| 2008/0071640 A1* | 3/2008 | Nguyen | G06Q 20/387 |
| | | | 705/14.27 |
| 2008/0082510 A1 | 4/2008 | Wang et al. | |
| 2008/0134043 A1 | 6/2008 | Georgis et al. | |
| 2008/0243637 A1 | 10/2008 | Chan et al. | |
| 2008/0301732 A1 | 12/2008 | Archer et al. | |
| 2009/0192945 A1* | 7/2009 | Perpina | G06Q 30/06 |
| | | | 705/80 |
| 2009/0292584 A1* | 11/2009 | Dalal | G06Q 30/0201 |
| | | | 705/7.29 |
| 2010/0083217 A1* | 4/2010 | Dalal | G06F 16/9535 |
| | | | 707/E17.108 |
| 2010/0122303 A1 | 5/2010 | Maloney | |
| 2010/0191582 A1* | 7/2010 | Dicker | G06Q 30/0631 |
| | | | 705/26.1 |
| 2010/0191619 A1 | 7/2010 | Dicker et al. | |
| 2010/0192180 A1* | 7/2010 | Olague | H04N 21/4316 |
| | | | 725/39 |
| 2010/0241699 A1* | 9/2010 | Muthukumarasamy | H04N 21/23109 |
| | | | 706/12 |
| 2010/0251304 A1 | 9/2010 | Donoghue et al. | |
| 2010/0299615 A1* | 11/2010 | Miluzzo | H04L 67/54 |
| | | | 715/752 |
| 2011/0040649 A1* | 2/2011 | Dooley | G06Q 20/382 |
| | | | 705/26.5 |
| 2011/0040655 A1* | 2/2011 | Hendrickson | H04L 67/52 |
| | | | 705/26.1 |
| 2011/0125569 A1* | 5/2011 | Yoshimura | G06Q 10/10 |
| | | | 705/26.1 |
| 2011/0276993 A1 | 11/2011 | Ferguson | |
| 2011/0302117 A1 | 12/2011 | Pinckney et al. | |
| 2011/0320380 A1 | 12/2011 | Zhan et al. | |
| 2012/0030587 A1 | 2/2012 | Ketkar | |
| 2012/0054666 A1 | 3/2012 | Baird-Smith et al. | |
| 2012/0095833 A1 | 4/2012 | Bleyl | |
| 2012/0150659 A1 | 6/2012 | Patel et al. | |
| 2012/0166964 A1* | 6/2012 | Tseng | G06F 3/048 |
| | | | 715/745 |
| 2012/0167132 A1 | 6/2012 | Mathews et al. | |
| 2012/0173351 A1* | 7/2012 | Hanson | G06Q 30/0635 |
| | | | 705/26.81 |
| 2012/0174159 A1 | 7/2012 | Arte et al. | |
| 2012/0204201 A1 | 8/2012 | Cassidy et al. | |
| 2012/0290448 A1* | 11/2012 | England | G06Q 30/0631 |
| | | | 705/27.2 |
| 2013/0006788 A1* | 1/2013 | Zhou | G06Q 30/02 |
| | | | 705/26.1 |
| 2013/0041781 A1* | 2/2013 | Freydberg | G06Q 30/06 |
| | | | 705/27.1 |
| 2013/0132205 A1* | 5/2013 | Harris | G06Q 30/0601 |
| | | | 705/17 |
| 2013/0211968 A1* | 8/2013 | Patro | G06Q 30/06 |
| | | | 705/27.1 |
| 2013/0262193 A1* | 10/2013 | Sundaresan | G06Q 30/06 |
| | | | 705/26.35 |
| 2013/0268377 A1* | 10/2013 | Jessup | G06Q 10/101 |
| | | | 705/26.2 |
| 2013/0290233 A1 | 10/2013 | Ferren et al. | |
| 2013/0311315 A1* | 11/2013 | Zises | G06Q 30/0605 |
| | | | 705/26.2 |
| 2013/0317980 A1* | 11/2013 | Davis | G06Q 20/40 |
| | | | 705/39 |
| 2014/0059617 A1 | 2/2014 | Knudson et al. | |
| 2014/0067998 A1 | 3/2014 | Garcia et al. | |
| 2014/0100991 A1* | 4/2014 | Lenahan | G06Q 30/0631 |
| | | | 705/26.7 |
| 2014/0143090 A1* | 5/2014 | Deyle | G06Q 10/0833 |
| | | | 705/26.35 |
| 2014/0164185 A1* | 6/2014 | Jung | G06Q 30/0601 |
| | | | 705/26.61 |
| 2014/0297395 A1* | 10/2014 | Chao | G06Q 30/0201 |
| | | | 705/14.41 |
| 2014/0310353 A1* | 10/2014 | Schneider | H04L 51/52 |
| | | | 709/204 |
| 2014/0344861 A1 | 11/2014 | Berner et al. | |
| 2015/0067724 A1 | 3/2015 | Johnson et al. | |
| 2015/0089517 A1* | 3/2015 | Ruffini | H04N 21/4826 |
| | | | 725/9 |

(56) References Cited

U.S. PATENT DOCUMENTS

| | | | |
|---|---|---|---|
| 2015/0220979 A1* | 8/2015 | Ouimet | G06Q 30/0633 |
| | | | 705/14.49 |
| 2015/0339303 A1* | 11/2015 | Perlegos | G06F 16/7867 |
| | | | 707/756 |
| 2015/0363843 A1* | 12/2015 | Loppatto | G06Q 30/0283 |
| | | | 705/330 |
| 2016/0142774 A1 | 5/2016 | Sayyadi-Harikandehei | |
| 2016/0212493 A1 | 7/2016 | Phadnis | |
| 2016/0335703 A1* | 11/2016 | Phadnis | G06Q 50/01 |
| 2017/0026703 A1* | 1/2017 | Phadnis | G06Q 30/0269 |
| 2017/0078750 A1 | 3/2017 | Ashkan et al. | |
| 2017/0094332 A1 | 3/2017 | Thomas et al. | |
| 2017/0094343 A1 | 3/2017 | Greene | |
| 2017/0164063 A1 | 6/2017 | Lewis et al. | |
| 2017/0171580 A1 | 6/2017 | Hirsch et al. | |
| 2017/0286901 A1* | 10/2017 | Skaff | G06V 10/751 |
| 2020/0019754 A1* | 1/2020 | Adato | G06V 20/62 |

FOREIGN PATENT DOCUMENTS

| | | |
|---|---|---|
| WO | 0207433 | 1/2002 |
| WO | 03056821 | 7/2003 |

OTHER PUBLICATIONS

Davoudi, Heidar, Morteza Zihayat, and Aijun An. "Time-aware subscription prediction model for user acquisition in digital news media." Proceedings of the 2017 SIAM International Conference on Data Mining. Society for Industrial and Applied Mathematics, 2017. (Year: 2017).*

United States Patent and Trademark Office, "Advisory Action," issued in connection with U.S. Appl. No. 15/111,777, on Jan. 15, 2020, (11 pages).

United States Patent and Trademark Office, "Non Final Office Action," issued in connection with U.S. Appl. No. 15/111,777, on Feb. 25, 2019, (67 pages).

United States Patent and Trademark Office, "Final Office Action," issued in connection with U.S. Appl. No. 15/111,777, on Oct. 4, 2019, (77 pages).

United States Patent and Trademark Office, "Notice of Allowance and Fee(s) Due," issued in connection with U.S. Appl. No. 15/111,777, on Apr. 28, 2020, (23 pages).

International Searching Authority, "International Search Report and Written Opinion" issued in connection with PCT Application No. PCT/IN15/00161, issued on Mar. 1, 2016, (9 pages).

United States Patent and Trademark Office, "Notice of Allowance and Fee(s) Due," issued in connection with U.S. Appl. No. 15/300,887 on Oct. 10, 2017, (33 pages).

European Patent Office, "Supplementary European Search Report," issued in connection with European patent application No. 15743973. 8, issued on Jun. 27, 2017, (1 pages).

European Patent Office, "Extended European Search Report," issued in connection with European patent application No. 15743973.8, issued on Jun. 9, 2017, (9 pages).

Wikipedia, "Electronic Program Guide," dated Jan. 10, 2014, retrieved from [https://en.wikipedia.org/w/index.php?title=Electronic_program_guied&oldid=590113618] on Aug. 9, 2017 (5 pages).

International Searching Authority, "International Search Report and Written Opinion" issued in connection with PCT Application No. PCT/IN15/00023, issued on May 10, 2015, (8 pages).

Weiß et al., "A User Profile-Based Personalization System for Digital Multimedia Content," Digital Interactive Media in Entertainment and Arts (DIMEA) 2008, pp. 281-288, Sep. 10, 2008, (8 pages).

Zimmerman et al., "TV Personalization System," In: Personalized Digital Television. Human-Computer Interaction Series, vol. 6. Springer, Dordrecht, 2004, (29 pages).

Ardissono et al., "User Modeling and Recommendation Techniques for Personalized Electronic Program Guides," In: Personalized Digital Television. Human-Computer Interaction Series, vol. 6. Springer, Dordrecht, 2004, (27 pages).

AT&T, "AT&T's Tips for picking a TV service to go with your new TV," available at https://www.att.com/Common/merger/files/pdf/U-verse_Switch_Tips.pdf, 2010, (2 pages).

Indian Patent Office, "Examination Report," issued in connection with application No. 140/MUM/2014, dated on Dec. 31, 2020, 7 pages.

Indian Patent Office, "Examination Report," issued in connection with Indian Application No. 1259/MUM/2014, dated Sep. 16, 2021, 7 pages.

* cited by examiner

METHOD, COMPUTER-READABLE MEDIUM, AND SYSTEM FOR MEDIA SUBSCRIPTION PACKAGE MANAGEMENT

RELATED APPLICATIONS

The present application arises from a continuation of U.S. patent application Ser. No. 15/111,777, filed on Jul. 14, 2016, which was a national stage entry of PCT/IN2015/000023, filed Jan. 15, 2015, which claims priority to IN 140/MUM/2014, filed Jan. 15, 2014. The full disclosures of U.S. patent application Ser. No. 15/111,777, PCT/IN2015/000023, and IN 140/MUM/2014 are incorporated herein by reference.

BACKGROUND

A. Technical Field

The present disclosure relates to a method and system for sale management, more particularly the disclosure relates to enhancing the service provider's ability to sell channels and packs to the users, by delivering user-preferences driven recommendations to service providers as well as to users.

B. Background Art

Television is, for the most part, a broadcast medium. That is, our television sets mostly just receive data and hardly ever send any feedback or response communication. This communication channel is mostly one way.

However, with advent of technology the reception at the television set has become interactive through modern receiving devices embedded and/or linked to the television set.

Electronic program guides are typically available for television and radio, and consist of a digitally displayed, menu of Broadcast programming scheduling information shown by a cable or satellite TV provider to its viewers on a dedicated channel. EPGs are broadcast.

Electronic program guides (EPGs) provide users of television, radio, and other media applications with continuously updated menus displaying broadcast programming or scheduling information for current and upcoming program.

EPGs are available through television (on set-top boxes), mobile phones, and on the web. Online TV Guides are becoming more ubiquitous.

However EPGs personalization is a challenge as several interest-based suggestions from one or several viewers on what to watch or record has to be incorporated into the EPG formation and syncing into the respective operator's device.

The available technologies cannot identify the user choices and preference for Channel/Program Viewing behaviour across multiple platforms. The available solutions cannot recommend personalized content to users.

Another challenge is proliferation of number of channels and program across every digital platform. As search & discovery of channels/programs becomes difficult, user repertoire starts getting limited to a few familiar channels & programs. Users are, as we know, program loyal, and not particularly channel loyal.

Since current digital Broadcasting infrastructure is largely a one way process, there is no technology available today to measure the preferences of each individual user. The data related to viewing history of a subscriber owned by the Service providers is inadequate in evaluating individual user preferences as the same includes the viewing preferences of all the users watching different programs on the same television set.

Any or all of the present systems and method thereof are not capable of evaluating and generating personalized recommendations based on user's preferred TV-watching-times.

The growing volumes of increasingly complex data associated such as schedules, ratings, user configuration information, channel lists, multimedia content corresponding index presents a unique problem for digital platforms to create opportunities for sampling new program/channel content.

Any or all of the present systems and method thereof are not capable of generating personalized recommendations based on user preferences, location which lead to up sell, cross sell, channels, Channels/add-on packs, VoD content, etc.

Any or all of the present systems and method thereof are not capable of co-relating user preferences with his subscriptions.

Any or all of the present systems and method thereof are not capable of providing increased sale through uniform personalized recommendations across various/multiple platforms.

Any or all of the present systems and method thereof fails to increase user sale through micro transactions based on user preferences.

For the reasons stated above, which will become apparent to those skilled in the art upon reading and understanding the specification, there is a need in the art for a system and method for delivery of user preferences driven recommendations to enhance the service provider's ability to sell channels and packs to the users that is scalable and independent/compatible to new technology platforms, uses minimum resources that is easy and cost effectively maintained and is portable and can be deployed anywhere in very little time.

SUMMARY

A method and system for sale management is disclosed. More particularly the disclosure relates to enhancing the service provider's ability to sell channels and packs to the users, by delivering user-preferences driven recommendations to service providers (108) as well as to users. The system receives at least one user transaction i.e. buy packs, add-ons, ALC, recharge etc. or the at least one user activity such as but not limited to browse, favourite, reminder, search, share, discuss and actively manages and records the plurality of activities of the plurality of user Each user activity such as but not limited to program browse, program favourite, set reminder, search, buy, upgrade, check-in, share, discuss, watch video are assigned weightages. Based on the user subscription info received and user activities and preference data, if any, the viewer preference data has been generated. The user activity and transaction data and accordingly the preference columns of the viewer dataset at the viewer preference manager (1014) are updated and a Recommended List of channels and programs based on User preference is generated. The resultant list of User-Preferences is further processed to generate list of recommended packs, a la carte channels, VOD etc. which is delivered to users, service providers (108), and broadcasters.

Some embodiments of the present disclosure involve a method. The method may involve receiving, for each subscriber of multiple subscribers to a digital content distribution service: (i) first data indicative of content consumption pattern of the subscriber, and (ii) second data indicative of a current subscription of the subscriber. The method may also involve, for each subscriber of the multiple subscribers, determining, based at least in part on the first data, a content preference of the subscriber. The method may also involve, for each subscriber of the multiple subscribers, determining recommended digital content which is: (i) available for distribution through the digital content distribution service, (ii) associated with the determined content preference of the subscriber, and (iii) not included in the current subscription of the subscriber indicated by the second data. The method may also involve sending data indicative of: (i) the recommended digital content determined for at least one of the multiple subscribers, and (ii) the at least one of the multiple subscribers. Such a method may be performed, for example, by a personalized subscription recommendation service that operates in coordination with a digital content distribution service.

Some embodiments of the present disclosure involve a method. The method may involve storing, for each subscriber of multiple subscribers to a digital content distribution service: (i) first data indicative of content consumption pattern of the subscriber, and (ii) second data indicative of a current subscription of the subscriber. The method may also involve sending a request for recommended digital content for one or more of the multiple subscribers. The request may include the first data and second data for each of the one or more of the multiple subscribers. The method may also involve, in response to sending the request, receiving data indicative of recommended digital content for each of the one or more of the multiple subscribers. The recommended digital content for each of the one or more of the multiple subscribers may be: (i) available for distribution through the digital content distribution service, (ii) associated with a content preference of the subscriber, and (iii) not included in the current subscription of the subscriber indicated by the second data. The method may also involve making a recommendation, to each of the one or more of the multiple subscribers, to purchase the recommended digital content for the subscriber. Such a method may be performed, for example, by a digital content distribution service that operates in coordination with a personalized subscription recommendation service.

DETAILED DESCRIPTION OF THE INVENTION

Figure 1:
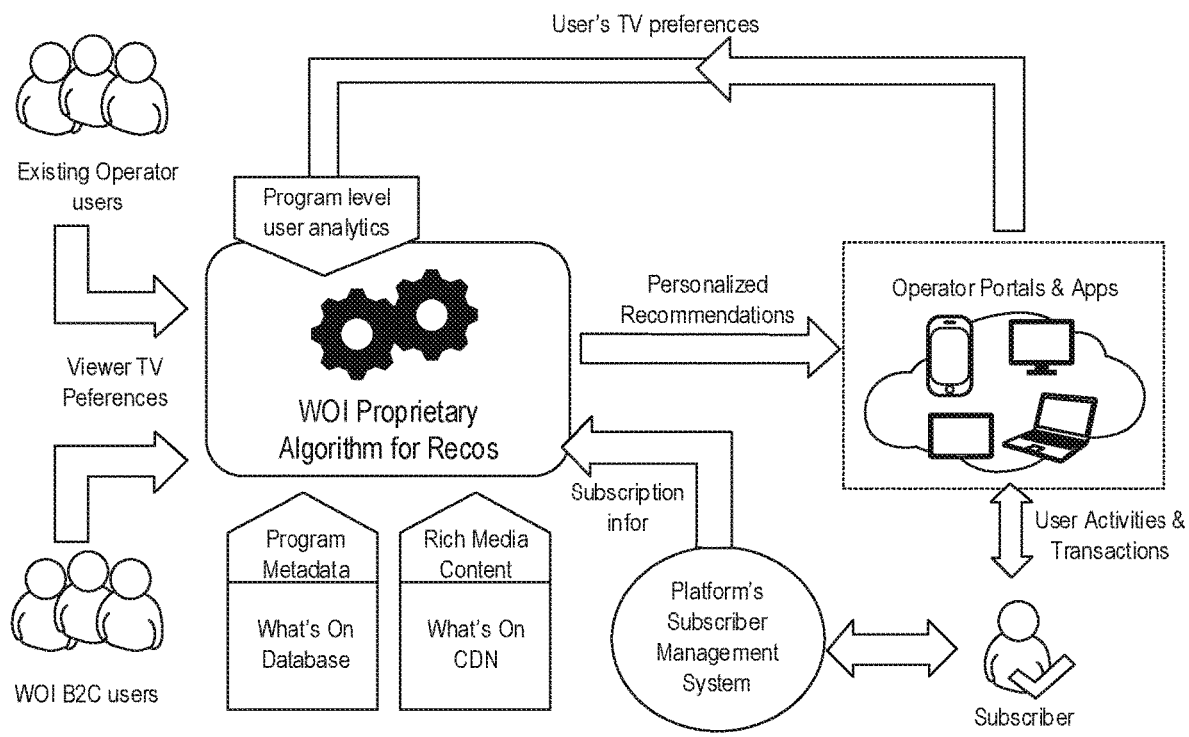
FIG. 1 is an example system flow diagram, in accordance with at least one embodiment.

The disclosure described herein is directed to increase sale and in effect revenue through a customized search and recommendations solution to service providers (108) which enables them to up sell, cross sell, upgrade existing users, thereby enhancing their average revenue per user (ARPU).

The embodiments herein provide a method and system for delivery of user preferences driven recommendations to enhance the service provider's ability to sell channels and packs to the users. Further the embodiments may be easily implemented in various Sale management structures. The method of the disclosure may also be implemented as application performed by a stand alone or embedded system.

The disclosure described herein is explained using specific exemplary details for better understanding. However, the disclosure disclosed can be worked on by a person skilled in the art without the use of these specific details.

References in the specification to "one embodiment" or "an embodiment" means that a particular feature, structure, characteristic, or function described in connection with the embodiment is included in at least one embodiment of the disclosure. The appearances of the phrase "in one embodiment" in various places in the specification are not necessarily all referring to the same embodiment.

Hereinafter, the preferred embodiments of the present disclosure will be described in detail. For clear description of the present disclosure, known constructions and functions will be omitted.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

Parts of the description may be presented in terms of operations performed by a computer system, using terms such as data, state, link, fault, packet, FTP and the like, consistent with the manner commonly employed by those skilled in the art to convey the substance of their work to others skilled in the art. As is well understood by those skilled in the art, these quantities take the form of data stored/transferred in the form of electrical, magnetic, or optical signals capable of being stored, transferred, combined, and otherwise manipulated through mechanical and electrical components of the computer system; and the term computer system includes general purpose as well as special purpose data processing machines, switches, and the like, that are standalone, adjunct or embedded. For instance, some embodiments may be implemented by a processing system that executes program instructions so as to cause the processing system to perform operations involved in one or more of the methods described herein. The program instructions may be computer-readable code, such as compiled or non-compiled program logic and/or machine code, stored in a data storage that takes the form of a non-transitory computer-readable medium, such as a magnetic, optical, and/or flash data storage medium. Moreover, such processing system and/or data storage may be implemented using a single computer system or may be distributed across multiple computer systems (e.g., servers) that are communicatively linked through a network to allow the computer systems to operate in a coordinated manner.

According to an embodiment of the present disclosure, the method and system for delivery of user preferences driven recommendations to enhance the service provider's ability to sell channels and packs to the users is in accordance to the operator devices.

As per the preferred embodiment of the present disclosure, the system and the method thereof of will enhance the service provider's ability to sell channels and packs to the users, hence enhancing their revenue. Through the user preferences driven recommendations via the connected devices.

As per one of the embodiment of the present disclosure, the search and recommendation system may also enhance ARPU regionally based on user preferences and channel/program popularity. The system and the method thereof helps service providers (108) to align with broadcasters and provide premium digital content which let users engage with channels/programs directly, hence opportunity for additional source for revenue.

As per one of the embodiment of the present disclosure, plurality of Recommendation engine (101) modules are deployed at the system. At least one user preferences and liking are captured from the user activities on the various/multiple user interface systems. The system is integrated with at least one SMS (Subscriber Management System) or at least one CRM (Customer Relations Management) System. The present disclosure, the operator's 'SMS' may be a third party system that stores all the subscriber account details like personal details, subscribed pack, account balance and validity, etc. The operator may provide the system an access to their 'SMS' system.

As per one of the embodiment of the present disclosure, once a subscriber logs-in on the operator portal, the system may activate API and receives the subscriber info like personal details, subscribed pack, account balance and validity, etc. The at least one subscriber info may be mapped into the system and may also displayed to the user on the user interface. The at least one subscriber info may be accessed in real time to be able to display personal account details to the subscribers. The changes in the at least one subscriber info may be communicated to the 'SMS' via APIs, if the at least one subscriber makes any changes to their profile info Also if the at least one subscriber makes any transaction or purchase activity like recharge, pack upgrade, channel buy, etc the transaction info is being sent to the 'SMS' via APIs.

As per one of the embodiment of the present disclosure, the system and the method thereof may map at least one subscriber/user likes and preferences against his subscriptions on the at least one service provider's platform with the help of this integration.

Turning now to FIG. 1, an example system flow diagram is provided. As depicted in the diagram, a recommendation system receives data regarding plurality of user's/subscriber's TV preference from at least one operator portals or apps. Data relative to the plurality of user's/subscriber's activities and transactions in the form of subscription info is received from at least one service provider platform's subscriber management system. The system also extracts existing plurality of operators users data and viewer tv preference. The system process the data to generate at least one recommendations list. These personalized recommendations are delivered to the plurality of user, at least one service providers (108) and at least one broadcasters.

Figure 2:
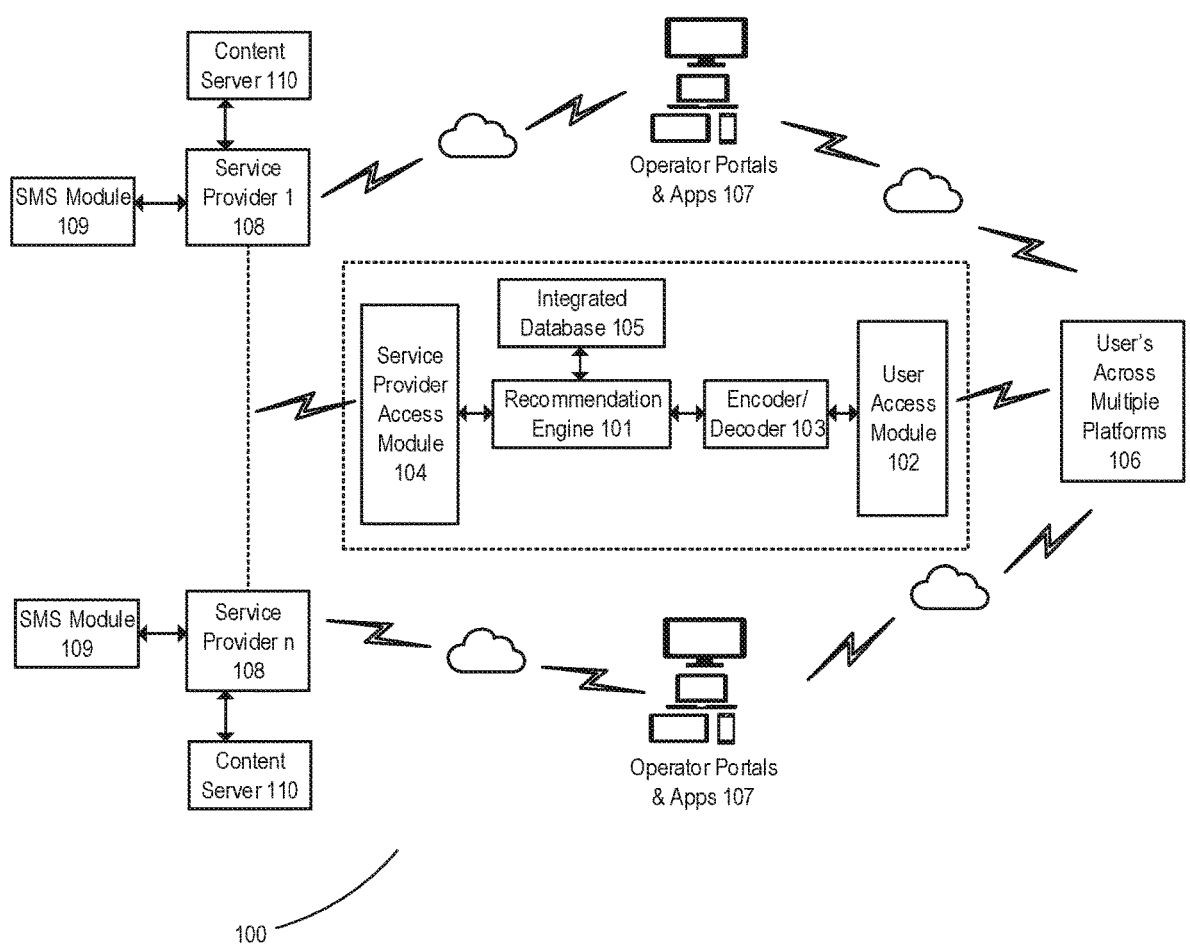
FIG. 2 is a block diagram of the Recommendation Engine integrated with the SMS or CRM system of the Service provider.

Referring now to the drawings and in particular to FIG. 2, a system 100 comprises of a Recommendation Engine 101 configured to generate user-preference driven recommendations, a User Access Module 102 configured to fetch user data from multiple platforms 106 such as but not limited to Operator Portals, Apps and an Encoder-Decoder 103 to convert it into a standard format, a Service Provider Access Module 104 configured to facilitate integration with the at least one SMS or at least one CRMS of the at least one Service providers (108) and push the at least one generated recommendation to the at least one user interactive platforms such as but not limited to Operator Portals, Apps used by the user, at least one service provider server 108 connected to the at least one cloud computing platform to interact with the plurality of user terminals, at least one SMS modules (109), at least one Content servers (110) and at least one service provider access module (104), a Integrated database 105 containing the listings metadata and plurality of user terminals (107) access by plurality of users. The system captures user transactions i.e. buy packs, add-ons, ALC, recharge etc. and user activities such as but not limited to browse, favourite, reminder, search, share, discuss. The at least one content library and metadata details are extracted from the at least one Integrated database (105) system and are provided for the analysis. The at least one user profile and at least one subscription data is extracted from the at least one SMS, at least one CRMS of the at least one service providers (108) and is provided for the analysis. A plurality of parameters based on which the analysis is to be performed are captured through at least one Parameters register bank (1015). The plurality of parameters may be classified into plurality of sub categories such as User analytics where count of plurality of user and plurality of user demographics such as but not limited to user location, user preference, and TV viewing language forms the parameters. In another subcategory as Usage Analytics a plurality of user logins count, viewing history, search pattern, user action analysis such as browse, favourite, reminders, check-ins etc. are the plurality of parameter listed. In yet another subcategory Transactional analytics, the subcategory Transactional analytics includes ALC sales analysis, pack upgrades, subscription pattern, sales pattern are the parameters listed. The at least one user subscription info and the at least one transaction history data is captured from the at least one SMS of the at least one service providers (108). Also, data regarding at least one earlier recommendation made to the user and the selection of at least one packs, channels/programs by the user from the at least one earlier recommendation is captured from the at least one SMS of the at least one service provider. At least one EPG metadata is also extracted from the at least one content servers (110) of the at least one service providers (108). Also, Operator business Rules are extracted from the at least one SMS of the at least one service provider through service provider access module (104). Operator business Rules are operator defined objectives and goals which it wishes to achieve. We apply Operator Business. Rules to the comparison/filtration process of recommendations to be shown to the user, so that the recommendations and sales are in-line with the Operator business goals. These can change from case to case and time to time. Operator Business Rules being applied to the recommendations engine includes but not limited to Pack Management, A-la-carte pricing of channels, Schemes and Offers for long-term subscription, multiple subscriptions, advance payments, Up sell unsubscribed channels during upgrades, recharges, Promoting VOD content or Catch-up TV, Promoting and pushing specific channels, Upgrade Rules—Pushing Product upgrades, Pack Upgrades, Long-term pack upgrades.

Figure 3:
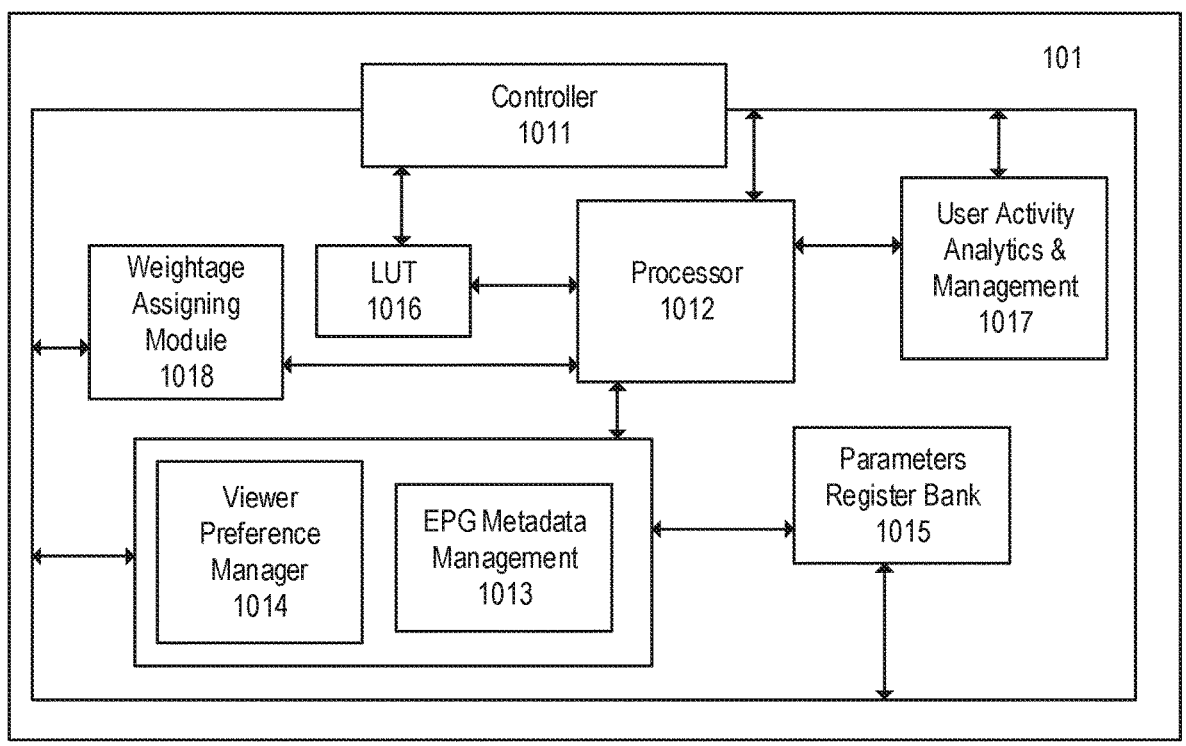
FIG. 3 is a Block diagram of Recommendation Engine

As per FIG. 3, The Recommendation Engine 101 comprises of a Controller 1011 configured to initialize and synchronize operations, a Processor 1012 configured to perform various operations, a EPG metadata management module 1013 containing the data relating to various channels, programs, etc., a Viewer preference manager module 1014 containing the data relating to individual users, a Parameters Register Bank 1015 for dynamically accessing data, an LUT 1016 wherein classification identifiers are stored, a User activity analytics and management Module

1017 configured to manage and analyse users activity, a Weightage Module 1018 configured to assign weightage to various Channels and programs.

The Recommendation engine (101) of the system receives through the at least one user activity analytics & management module (1017) at least one user transaction i.e. buy packs, add-ons, ALC, recharge etc. or the at least one user activity such as but not limited to browse, favourite, reminder, search, share, discuss and actively manages and records the plurality of activities of the plurality of user respectively by classifying the plurality of activities respective to plurality of users. The at least one processor (1012) of the Recommendation engine (101) receives data regarding at least one earlier recommendation made to the user and selection of at least one packs, channels/programs made by the at least one user from the at least one earlier recommendation from the service provider access module (104). The at least one processor (1012) of the Recommendations engine also tracks the conversions happening from recommendations made to a user. User may either explore more about a recommendation which signifies interest towards the recommendation made OR may buy from a recommendation which is a pure conversion from recommendation to sale. Tracking these help improve user preferences and hence further improve recommendations for that user. A plurality of weightages defined for each activity are assigned to respective activities data received by the Recommendation engine (101). The weightage module (1018) is configured to assign weightages. Each user activity such as but not limited to program browse, program favourite, set reminder, search, buy, upgrade, check-in, share, discuss, watch video are assigned weightages. Weightages assigned to each parameter is not fixed and is configurable on the basis of market needs and operator rules. Weightages are reviewed and adjusted on a regular basis to adapt changes in technology or deployments on portals and apps. The weightages can be adjusted based on new parameters introduced or new platforms being launched. Based on the user subscription info received and user activities and preference data, if any, the viewer preference data has been generated. The user activity and transaction data received is forced through the sequence comparator and multistage filter logic. A comparator and filter process is executed by the Recommendation engine (101) wherein the at least one processor (1012) of the at least one Recommendation engine (101) is designed as a sequence comparator and multistage filter and configured to execute the at least one sequence comparator and multistage filter logic state machine. The user activity and transaction data received and the data extracted from the at least one SMS/the at least one CRMS is forced through the at least one sequence comparator and multistage filter logic, the result of which are used to assign genre, type, rating etc. to the user activity and transaction data and accordingly the preference columns of the viewer dataset at the viewer preference manager (1014) are updated. The received user activity and transaction data and the data extracted from the at least one Integrated database (105) is forced through the at least one sequence comparator and multistage filter logic, the result of which are used to assign genre, type, rating etc. to the user activity and transaction data and accordingly a preference column of at least one viewer dataset at the at least one viewer preference manager (1014) are updated. The received user activity and transaction data and the data extracted from the subscriber viewing information is forced through the at least one sequence comparator and multistage filter logic, the result of which are used to assign genre, type, rating etc. to the user activity and transaction data and accordingly the at least one preference column of the at least one viewer dataset at the at least one viewer preference manager (1014) are updated. The at least one processor (1012) of the Recommendation engine (101) then ranks the user liking/interest as per classification information and viewing information to determine preferences. The determined preferences are then processed with data regarding selection of at least one packs, channels/programs made by the user from the at least one earlier recommendation, plurality of operator business rules, the plurality of available programs and plurality of channels, the data for which is provided to the at least one processor (1012) by the at least one EPG metadata management module (1013) to generate at least one Recommended List of plurality of channels and plurality of programs based on User preference. The resultant list of User-Preferences and Recommended List of Channels and programs is compared with the available plurality of subscription packs and subscribed pack. If the recommended pack is not the same as the at least one subscribed pack, then a preferred list of plurality of recommended packs is generated. However if the recommended pack is the same as the subscribed pack then a la carte channels, VOD etc. are recommended.

For example, for a user who likes romantic movies, he performs search for movies on portal, comments on the movies on the social networking portal etc. These activities are captured through the API at the service provider's portals and the social networking portals by the system through the at least one user access module (102). The at least one Encoder-decoder module (103) converts the data in various formats from different sources in to the compatible format. The at least one weightage module (1018) of the at least one Recommendation engine (101) assigns the higher point weightage to the social networking portal and secondary weightage to the search. The at least one Recommendation engine (101) extracts the user subscription info from the service provider database which indicates the user is subscribed to free news channels and free movie channels. The at least one Recommendation engine (101) generates the preference data based on the info from the at least one service provider database. The at least one Recommendation engine (101) assign the genre type to the activity as movie—romantic and execute the at least one comparator and filter logic for of the selection preferred channel packs wherein the service provider is provided with the channel to be recommended to the user and user is proposed with a pack which includes channels telecasting the movie of his preference.

In another example the same user simultaneously also search for the world cup cricket match along with search for movies on portal, and comments on the movies on the social networking portal and watch video of cricket match on you tube. Considering the activities the at least one Weightage module (1018) of the at least one Recommendation engine (101) assigns the higher point weightage to the social networking portal activity and secondary weightage to you tube activity of watching match video and lowest weightage to the search. The at least one Recommendation engine (101) extracts the user subscription info from the at least one service provider database which indicates the user is subscribed to free news channels and free movie channels. The at least one Recommendation engine (101) generates a preference data based on the info from the at least one service provider database. The Recommendation engine (101) assign the genre type to the activity as movie—romantic, sports—cricket and execute the comparator and filter logic for of the selection preferred channel packs wherein the service provider is provided with the channel to be recommended to the user and the user is proposed with a pack which includes channels telecasting the cricket matches and movie of his preference.

Figure 4:
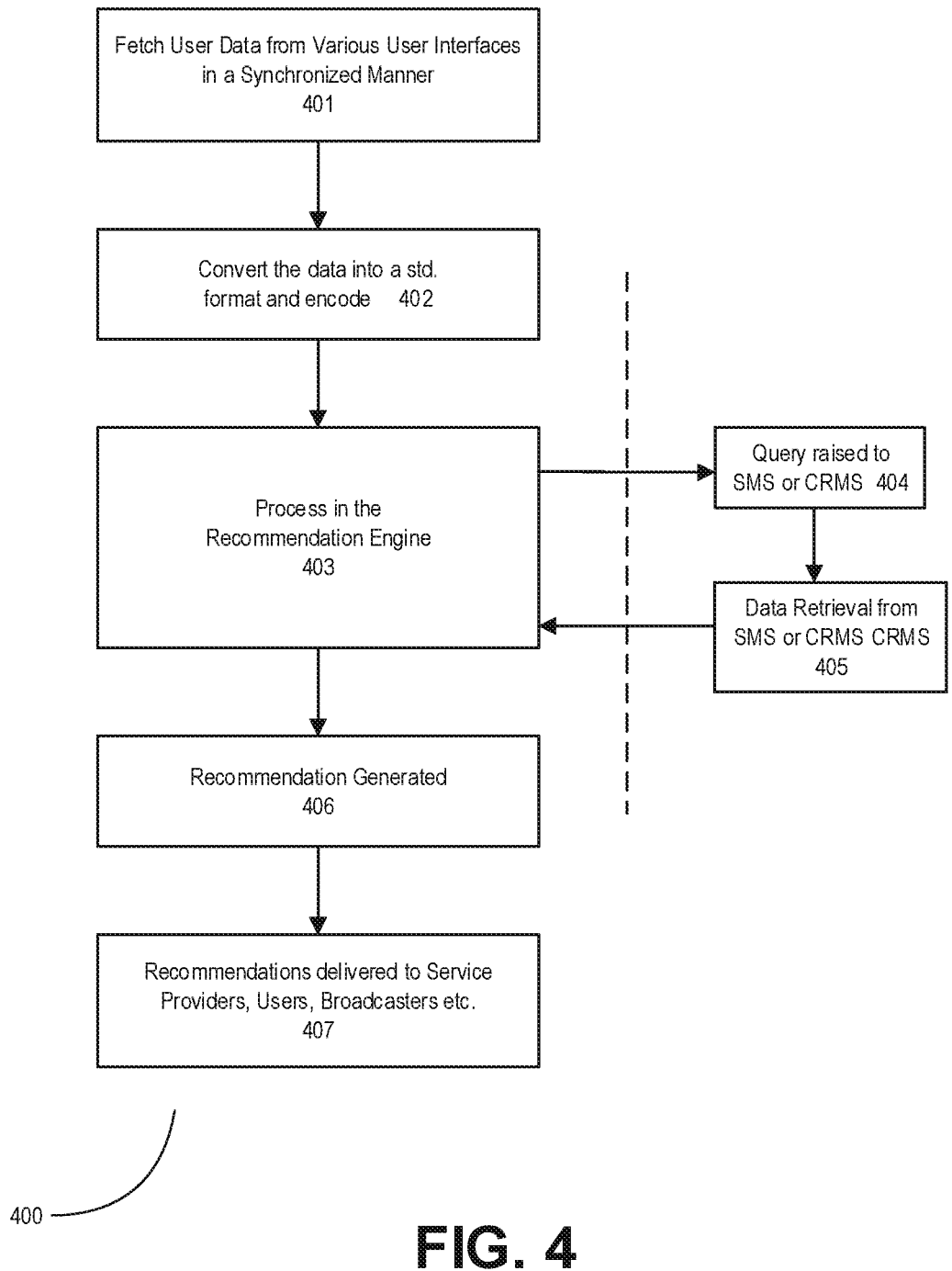
FIG. 4 describes the process of generating and delivering user-preference driven recommendations.

FIG. 4 illustrates the overall flow of generation and delivery of user-preference driven recommendations. The at least one User access module (102) fetches data from various user interfaces (401) and (the at least one encoder encodes the information, converts it into a standard data format and supplies (402) it to the at least one Recommendation engine (101). The system is capable of integration with the at least one Subscriber Management System or the at least one Customer Relations Management System of the at least one Service Provider. If the at least one SMS or the at least one CRMS is integrated with the system (404), then the at least one Recommendation engine (101) processes (403) the information retrieved from the at least one SMS and at least one CRMS as well (405). The at least one Recommendation engine (101) generates recommendations (406) which are then provided to the at least one Service providers (108), at least one Broadcasters, and Users et al (407).

Figure 5:
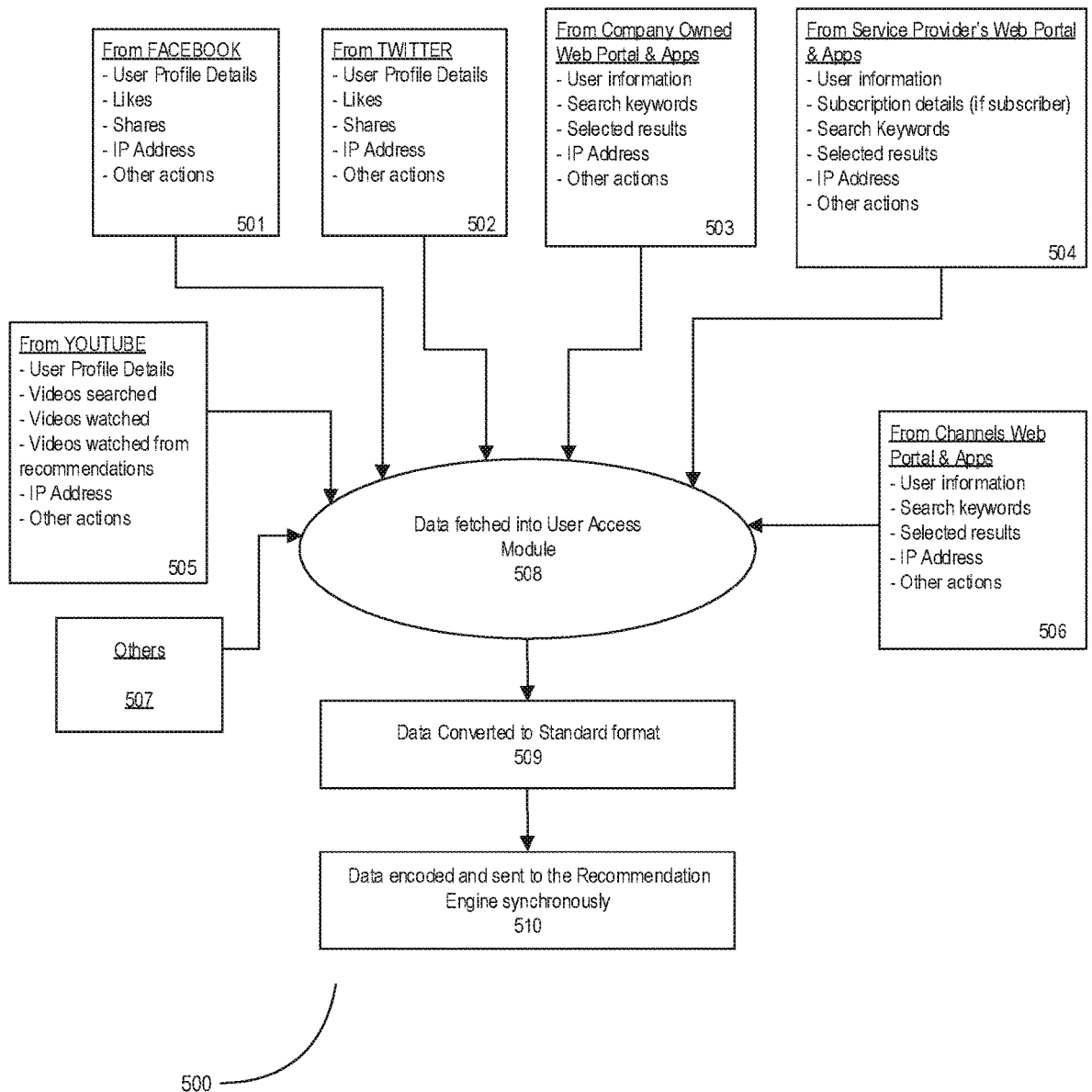
FIG. 5 describes the process of fetching data from various sources to provide as an input to the Recommendation Engine.

FIG. 5 describes the sources from which the at least one User access module fetches data. It fetches data from multiple interfaces for eg. Social Media websites like Facebook (501), Twitter (502), Youtube (505) etc, Web portal and apps of Service Provider (504), Company owned web portal or apps (503), and independent Channels etc. The metadata and relevant information of a User using any of these websites/web services is captured (508) by the at least one User access module (102) to be fed to the at least one Recommendation engine (101) for further processing. When a User accesses Facebook, his profile details, Likes, Shares etc. are captured. From Twitter the User profile details, follows, shares etc. are captured. From youtube, the profile details of a user, videos searched, videos watched, videos watched from recommended videos, etc. are captured. From the at least one Service Provider's Web portal and apps, whenever a User logs in, the User information, Subscription details (if a subscriber), search keywords, selected results, etc. are captured. Similarly when a user logs in to the Web Portal and apps of EPG manager, the user information, search keywords, selected results etc. are captured. Likewise if a user logs in the channels web portal or channels apps, user information, search keywords, selected results etc. are captured. All this captured data is converted into a standard format (509) and fed to the Recommendation engine (101) for further processing (510).

Figure 6:
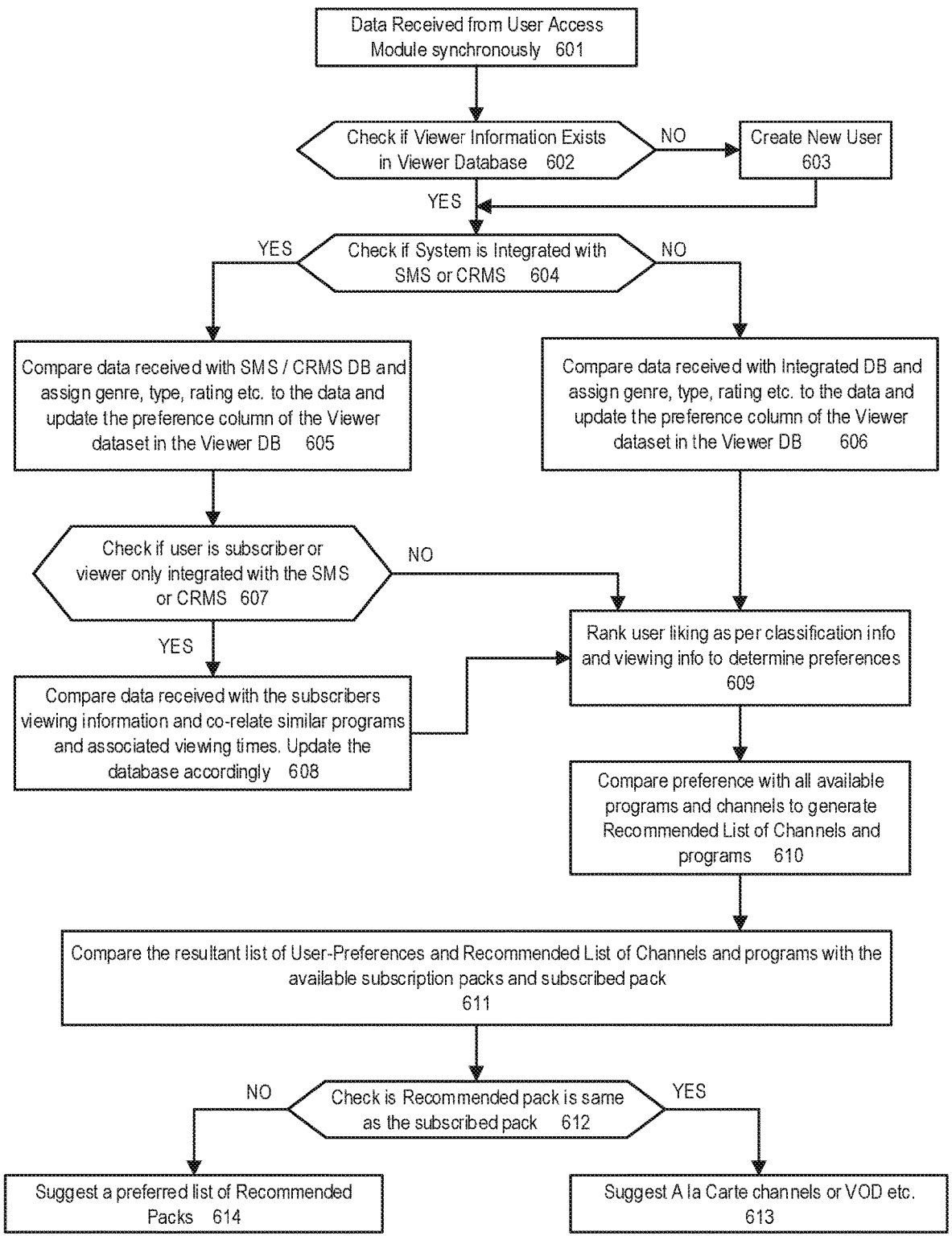
FIG. 6 describes the working of Recommendation Engine

FIG. 6 describes the working of the at least one Recommendation engine (101). Once the at least one RE receives data (601) from the at least one User access module, it checks if the user information corresponds to any user (602) in its at least one Viewer Database of the at least one Viewer preference manager module (1014). If the user information is not available in the database, then it creates a new user (603) by entering available information into the corresponding columns of the Viewer dataset. The at least one RE then compares the interest/liking of the user from the data received with the Integrated database (105) to assign genre, type, rating, etc. to the data and updates the liking/interest column of the at least one Viewer dataset in the Viewer DB. If the system is integrated (604) with the at least one SMS/the at least one CRMS of the at least one Service Provider, then the interest/liking of the user from the data is compared with the data (605) in the at least one SMS/at least one CRMS DB to assign genre, type, rating, etc. to the data and updates the liking/interests column of the at least one Viewer dataset in the at least one Viewer DB (606). If the User is also a subscriber (607), the subscriber viewing information is co-related with similar programs and associated viewing times and the database is updated accordingly (608).

The Recommendation engine (101) then ranks the user liking/interest as per classification information and viewing information to determine preferences (609). The determined preferences are then compared with the available programs and channels to generate a Recommended List of channels and programs based on User preference (610). The resultant list of User-Preferences and Recommended List of Channels and programs is compared with the available subscription packs and subscribed pack (611). If the recommended pack is not the same as the subscribed pack (612), then a preferred list of recommended packs is generated (614). However if the recommended pack is the same as the subscribed pack then a la carte channels, VOD etc. are recommended (613).

Figure 7:
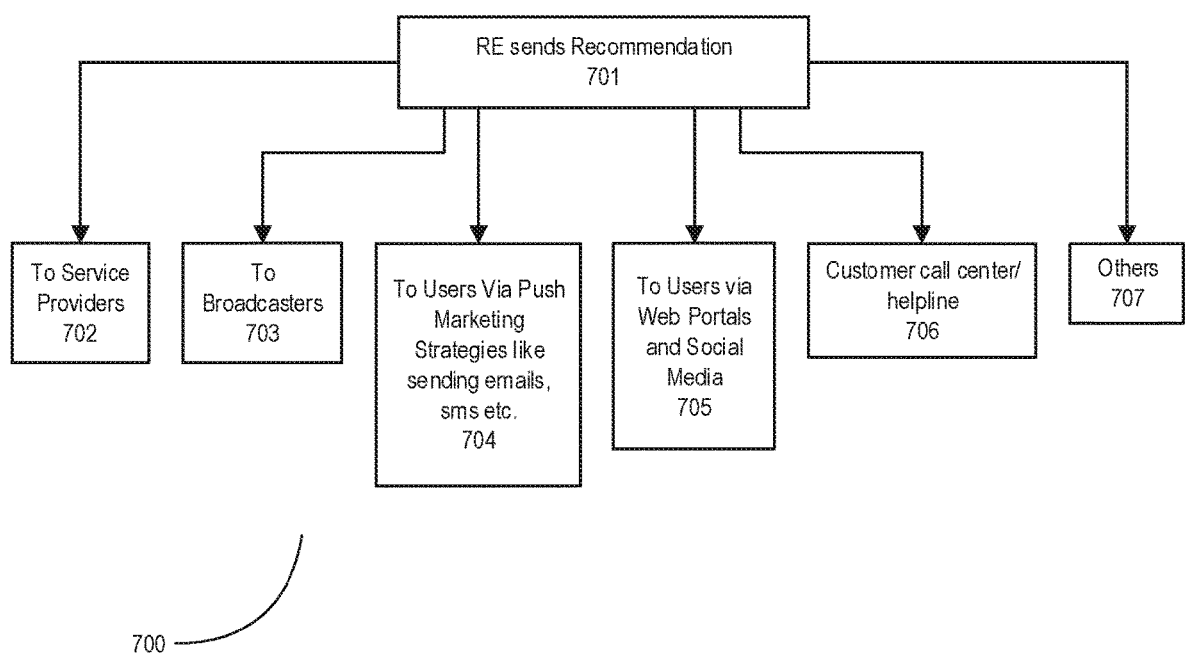
FIG. 7 describes the process of delivery of user-preference driven recommendations to the Service providers (108), Broadcasters and the users.

FIG. 7 describes the delivery of at least one recommendation (701) to at least one service providers (702), at least one Broadcasters (703) and at least one users (704). The at least one Recommendation engine (101) ranks the user liking/interest as per classification information and viewing information to determine preferences. The determined preferences are then compared with the available programs and channels to generate a Recommended List of plurality of channels and plurality of programs based on at least one User preference. The resultant list of User-Preferences and Recommended List of plurality of Channels and plurality of programs is compared with the available plurality of subscription packs and the at least one subscribed pack. If the at least one recommended pack is not the same as the at least one subscribed pack, then a preferred list of at least one recommended packs is generated. However if the recommended pack is the same as the subscribed pack then a la carte channels, VOD etc. are recommended. The at least one Recommendation engine (101) delivers the generated list of recommended packs, a la carte channels, VOD etc, to users, service providers (108), customer call center/helpline (706), broadcasters (703) and others (707).

The service providers (108) and broadcaster may use the classified plurality of recommendation lists for plurality of user and accordingly modify the pack configuration to increase the subscription.

As per one of the embodiment of the present disclosure, the system and the method thereof may generate personalized recommendations (A-la-carte channels, Video on Demand, Movies, top-ups, pack upgrades, etc) based on the at least one subscriber/user activities and preferences, as well as current subscriptions.

As per one of the embodiment of the present disclosure, the system and the method thereof, at least one personalized recommendation may be pushed to the users via the subscribers/user interface systems and push marketing activities like SMS, email, etc.

As per one of the embodiment of the present disclosure, the system and the method thereof, at least one personalized recommendation may have like take up rate thus enhancing the ARPU for the service providers (108).

As per one of the embodiment of the present disclosure, the system and the method thereof, at least one personalized recommendation may be pushed to the users via service providers (108) channel content, channel/program previews, trailers, information on popularity of channels, etc; through the various portals and apps.

As per one of the embodiment of the present disclosure, the system and the method thereof may enable at least one subscriber/user to make online payment via several modes of payment like net banking, debit card, credit card, etc through Payment Gateway.

As per one of the embodiment of the present disclosure, the system and the method thereof may step-up ARPUs by up-sell, cross-sell, upgrades and top-ups for at least one subscribers/user. This system increases sale of individual channels and Add-on packs through targeted one to one recommendations. The Recommendation engine (101) intelligently computes items that are not subscribed by the user and still have high relevance for the user.

As per one of the embodiment of the present disclosure, the system and the method thereof may generate personalized program and channel recommendations based on various parameters which lead to channel sales. The system also mixes search results with recommendations, and develops recommendations based on friends/social activities.

As per one of the embodiment of the present disclosure, the system and the method thereof may be designed to use effective personalized recommendations to generate multiple 'means to buy' a certain content/channel.

As per one of the embodiment of the present disclosure, the system and the method thereof may provide service providers (108) with personalized recommendations for its existing at least one subscriber/user which will help the service providers (108) to up sell, cross sell, top-up and upgrade.

As per one of the embodiment of the present disclosure, the system and the method thereof may be deployed on online portals like websites, mobile portals and apps, social networking platforms, etc. And also on Mobile, Tablets, connected Set-top-Boxes and Smart TVs as integrated Apps (compatible on all operating systems).

As per one of the embodiment of the present disclosure, the system and the method thereof may drive up-sell & cross sell of channels, add-on packs, etc through recommendations; may encourage A-la-carte channel, VOD/PPV sale; may personalized push marketing via mailers, SMS & on screen recommendations and thus may increase revenue though Ad content regulation and tariff plan structuring based on popular channels in particular regions, etc.

As per one of the embodiment of the present disclosure, the system and the method thereof may provide improved Content Discovery based on individual preferences to at least one subscriber/user.

As per one of the embodiment of the present disclosure, high relevance of recommendations may lead to better engagement with brand.

The present disclosure may overcome the challenges of the current scenario through the described system and method of delivering at least one subscriber/user preferences driven recommendations to enhance the service provider's ability to sell channels and packs to the at least one subscriber/user.

Another example embodiment may involve a personalized subscription recommendation service that is communicatively coupled to a digital content distribution service. The digital content distribution service may be implemented as a system of one or more servers that function to stream digital content to one or more subscribers via one or more communication networks (e.g., the Internet, broadcast networks, etc.). Such content may be streamed in response to requests for that content (e.g., on demand content) and/or may be provided in accordance with a predetermined schedule (e.g., broadcast programming). Thus, among other features and subsystems, the digital content distribution service may include a subscriber management system, sources of content, and various portals for making that content available for viewing by subscribers. In some examples, the digital content distribution service may provide a set of content packages from which individual subscribers can elect to subscribe (i.e., purchase). Each such content package may include a combination of video content channels and/or on demand video content and may be grouped in accordance with various factors such as genre, language, cost considerations, etc. The personalized subscription recommendation service may be implemented as a system of one or more servers that function to generate subscription recommendations for individual subscribers to the digital content distribution system.

For example, referring to FIG. 2, the digital content distribution system may include the service provider 108, and the personalized subscription recommendation service may include the recommendation engine 101 and one or more of the other modules within the dashed rectangle. Thus, in operation, the digital content distribution service may communicate with the personalized subscription recommendation service to obtain personalized subscription recommendations for at least some of the subscribers to the digital content distribution service and then make purchasing recommendations to those subscribers on that basis. One such example subscription recommendation process is described below.

The digital content subscription service may compile and store data indicative of content preferences of each subscriber to the service (e.g., program viewing histories). For instance, while a given subscriber accesses the digital content distribution service via one or more viewing devices associated with that subscriber, the digital content distributions service may log interactions that relate to content portrayed on the subscriber's device, searches for content using the subscriber's device, and/or other indications of content preferred by the subscriber. The digital content subscription service can then send at least some data indicative of the content preferences of the subscriber to the personalized subscription recommendation service along with data indicative of the current subscription of the subscriber.

At the personalized subscription recommendation service, the data indicative of the subscriber's content preferences can be analysed to identify related and/or similar content. For instance, the programs in a subscriber's viewing history can each be associated with a genre (e.g., action, romance, drama, sports), source of the content (e.g., actor(s), director, producer(s), studio(s)), a language (e.g., English, Hindi, Tamil, French, etc.), and/or other factors that characterize the type of content viewed by the subscriber. The various factors related to the subscriber's viewing history and/or other factors, such as a genre interest or sports team previously identified by the subscriber, are then combined to determine a content preference of the subscriber. In some cases, the content preference(s) of the subscriber (e.g., the subscriber's content preference profile) may be determined by combining multiple factors and weighting each factor differently. For instance, content preference data based on viewing histories may be weighted in part based on the recency of the viewing history relative to other content preference data. Many other examples are also possible.

The content preference of the subscriber (or content preference profile) may then be compared against the available content distributed through the digital content distribution service to identify available content which is both: (i) available through the digital content distribution service, (ii) associated with the content preference of the subscriber, and (iii) not included in the subscriber's current subscription. For instance, the personalized subscription recommendation service may first determine a degree of correspondence between the content preference determined for the subscriber and content categories of each of a set of subscription packages available through the digital content distribution service. As an example, a subscription package with a high degree of overlap between the content categories associated with the package and the content preference(s) determined for the subscriber will have a higher degree of correspondence than a subscription package with less overlap. The personalized subscription recommendation service may rank the available subscription packages based on their relative degree of correspondence with the subscriber's content preference(s). The personalized subscription recommendation service can then select one or more of the most highly ranked subscription packages as the subscription recommendation, and send an indication of the recommendation to the digital content distribution service. The personalized subscription recommendation service can also send an indication of the particular subscriber to which the recommendation pertains so that the digital content distribution service can associate the received recommendation with the particular subscriber. The digital content distribution service can use the received recommendation as a basis for making a corresponding recommendation to the subscriber to purchase one or more additional subscription packages (e.g., via the portal of the digital content distribution service).

In addition, the personalized subscription recommendation service may filter the set of available subscription packages to eliminate any subscription packages that the subscriber is already subscribed to. In other words, the personalized subscription recommendation service may filter the subscription packages to generate a subset of subscription packages that includes only those subscription packages that are not included in the subscriber's current subscription. The personalized subscription recommendation service can then select one of the subset of subscription packages as the subscription recommendation. In some examples, the set of available subscription packages may be filtered prior to determining the degree of correspondence between the subscriber's content preference(s) and the available subscription packages. As a result, the degree of correspondence may be determined only for those subscription packages that are not already included in the subscriber's current subscription, which saves computing resources and lowers processing time.

In some examples, the systems described herein, such as system 100, may include one or more processors (1012), one or more forms of memory, one or more input devices/interfaces, one or more output devices/interfaces, and machine-readable instructions that when executed by the one or more processors (1012) cause the system to carry out the various operations, tasks, capabilities, etc., described above.

In some embodiments, the disclosed techniques can be implemented, at least in part, by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes shown and described in connection with FIGS. 1-7.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

Further, while one or more operations have been described as being performed by or otherwise related to certain modules, devices or entities (e.g., the User Access module 102 or the Viewer preference manager module 1014), the operations may be performed by or otherwise related to any module, device or entity. As such, any function or operation that has been described as being performed by the device 102 could alternatively be performed by a different server, by the Recommendation engine platform 101, or a combination thereof. For instance, in one example, one server could generate and transmit a list of user activities for a particular user based on one or more content and/or viewing attributes associated with that user, and another server or user-associated terminal, such as one of the multiple platforms 106, could generate and display information associated with one or more items in the list of content for viewing by the particular user.

Further, the operations need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A computing system comprising:
a processor;
an application programming interface (API); and
memory including instructions that, when executed, cause the processor to:
access, by a recommendation engine including the processor using a first user access module, first data provided from a first server associated with a plurality of social media service providers, wherein the first data indicates a first plurality of user activities captured by the API and from a plurality of portals associated with the plurality of social media service providers, and wherein the first data corresponds to a user at least one of the user: (i) liking a media item, (ii) sharing the media item, or (iii) posting a comment about the media item, on a plurality of platforms of the social media service providers, and wherein the first data comprises a plurality of data sets, and wherein each data set is associated with a respective social media service provider of the plurality of social media service providers, and wherein the processor has converted each data set of the plurality of data sets into a standard data format;
access, by the recommendation engine using a second user access module, second data provided from a second server associated with a media content service provider, wherein the second data indicates a second user activity corresponding to the user inputting a media search command on a platform of the media content service provider captured by the API;
determine, by the recommendation engine using a weightage assigning module, weighted values for the first plurality of user activities and the second user activity;
based on the determined weighted values, determine, by the recommendation engine using a viewer preference manager, a content preference for the user;
based on the determined content preference for the user, identify, by the recommendation engine using a programming guide metadata management module, a plurality of media subscription packages, wherein each media subscription package of the plurality of media subscription packages includes a corresponding plurality of media content sources;
access, by the recommendation engine using a service provider access module, third data provided from a third server associated with the media content service provider, wherein the third data indicates subscribed media content sources the user is subscribed to;
filter, by the recommendation engine using the processor, the plurality of media subscription packages based on the subscribed media content sources indicated by the third data, wherein filtering the plurality of media subscription packages includes (i) identifying a first set of media subscription packages and a second set of subscription packages, wherein each media subscription package in the first set of media subscription packages includes at least one of the subscribed media content sources, wherein each media subscription package in the second set of media subscription packages does not include at least one of the subscribed media contents sources and (ii) removing from the plurality of media subscription packages the first set of media subscription packages; and
provide, by the recommendation engine using the service provider access module, a recommendation to the user including the filtered plurality of media subscription packages.

2. The computing system of claim 1, wherein the second data corresponds to a different format than the first data, the processor to convert the first data and the second data into the standard data format.

3. The computing system of claim 1, wherein the processor is to offer the filtered plurality of media subscription packages to the user for purchase.

4. The computing system of claim 1, wherein the processor is to:
access information that indicates a media subscription purchase history of the user; and
identify the plurality of media subscription packages further based on the information.

5. The computing system of claim 1, wherein the processor is to:
access information that indicates a preferred media genre of the user; and
identify the plurality of media subscription packages further based on the information.

6. The computing system of claim 1, wherein the processor is to:
access information that indicates a media viewing history of the user; and
identify the plurality of media subscription packages further based on the information.

7. The computing system of claim 1, wherein the processor is to:
access information that indicates web-browsing activity of the user; and
identify the plurality of media subscription packages further based on the information.

8. The computing system of claim 7, wherein the information includes an indication of one or more online videos viewed by the user.

9. A non-transitory computer-readable medium comprising instructions that, when executed, cause a processor to at least:
access, by a recommendation engine including the processor using a first user access module, first data provided from a first server associated with a plurality of social media service providers, wherein the first data indicates a first plurality of user activities captured by an application programming interface (API) and from a plurality of portals associated with the plurality of social media service providers, and wherein the first data corresponds to a user at least one of the user: (i) liking a media item, (ii) sharing the media item, or (iii) posting a comment about the media item, on a plurality of platforms of the social media service providers, and wherein each data set is associated with a respective social media service provider of the plurality of social media service providers, and wherein the processor has converted each data set of the plurality of data sets into a standard data format;
access, by the recommendation engine using a second user access module, second data provided from a second server associated with a media content service provider, wherein the second data indicates a second user activity corresponding to the user inputting a media search command on a platform of the media content service provider captured by the API;
determine, by the recommendation engine using a weightage assigning module, weighted values for the first plurality of user activities and the second user activity;
based on the determined weighted values, determine, by the recommendation engine using a viewer preference manager, a content preference for the user;
based on the determined content preference for the user, identify, by the recommendation engine using a programming guide metadata management module, a plurality of media subscription packages, wherein each media subscription package of the plurality of media subscription packages includes a corresponding plurality of media content sources;
access, by the recommendation engine using a service provider access module, third data provided from a third server associated with the media content service provider, wherein the third data indicates subscribed media content sources the user is subscribed to;
filter, by the recommendation engine using the processor, the plurality of media subscription packages based on the subscribed media content sources indicated by the third data, wherein filtering the plurality of media subscription packages includes (i) identifying a first set of media subscription packages and a second set of subscription packages, wherein each media subscription package in the first set of media subscription packages includes at least one of the subscribed media content sources, wherein each media subscription package in the second set of media subscription packages does not include at least one of the subscribed media contents sources and (ii) removing from the plurality of media subscription packages the first set of media subscription packages; and provide, by the recommendation engine using the service provider access module, a recommendation to the user including the filtered plurality of media subscription packages.

10. The computer-readable medium of claim 9, wherein the second data corresponds to a different format than the first data, the instructions to further cause the processor to convert the first data and the second data into a standard data format.

11. The computer-readable medium of claim 9, wherein the instructions further to cause the processor to offer the filtered plurality of media subscription packages to the user for purchase.

12. The computer-readable medium of claim 9, wherein the instructions further to cause the processor to:
   access information that indicates a media subscription purchase history of the user; and
   identify the plurality of media subscription packages further based on the information.

13. The computer-readable medium of claim 9, wherein the instructions further to case the processor to:
   access information that indicates a preferred media genre of the user; and
   identify the plurality of media subscription packages further based on the information.

14. The computer-readable medium of claim 9, wherein the instructions further cause the processor to:
   access information that indicates a media viewing history of the user; and
   identify the plurality of media subscription packages further based on the information.

15. The computer-readable medium of claim 9, wherein the instructions further cause the processor to:
   access information that indicates web-browsing activity of the user; and
   identify the plurality of media subscription packages further based on the information.

16. A method comprising:
   receiving, by a recommendation engine including a processor of a computing system using a first user access module, first data from a first server associated with a plurality of social media service providers, wherein the first data indicates a first plurality of user activities captured by an application programming interface (API) of the computing system and from a plurality of portals associated with the plurality of social media service providers, and wherein the first data corresponds to a user at least one of the user: (i) liking a media item, (ii) sharing the media item, or (iii) posting a comment about the media item, on a plurality of platforms of the social media service providers, and wherein each data set is associated with a respective social media service provider of the plurality of social media service providers, and wherein the computing system has converted each data set of the plurality of data sets into a standard data format;
   receiving, by the recommendation engine of the computing system using a second user access module, second data from a second server associated with a media content service provider, wherein the second data indicates a second user activity corresponding to the user inputting a media search command on a platform of the media content service provider captured by the API;
   determining, by the recommendation engine of the computing system using a weightage assigning module, weighted values for the first plurality of user activities and the second user activity;
   based on the determined weighted values, determining, by the recommendation engine of the computing system using a viewer preference manager, a content preference for the user;
   based on the determined content preference for the user, identifying, by the recommendation engine of the computing system using a programming guide metadata management module, a plurality of media subscription packages, wherein each media subscription package of the plurality of media subscription packages includes a corresponding plurality of media content sources;
   receiving, by the recommendation engine of the computing system using a service provider access module, third data from a third server associated with the media content service provider, wherein the third data indicates subscribed media content sources the user is subscribed to;
   filtering, by the recommendation engine of the computing system using the processor, the plurality of media subscription packages based on the subscribed media content sources indicated by the third data, wherein filtering the plurality of media subscription packages includes (i) identifying a first set of media subscription packages and a second set of subscription packages, wherein each media subscription package in the first set of media subscription packages includes at least one of the subscribed media content sources, wherein each media subscription package in the second set of media subscription packages does not include at least one of the subscribed media contents sources and (ii) removing from the plurality of media subscription packages the first set of media subscription packages; and
   providing, by the recommendation engine of the computing system using the service provider access module, a recommendation to the user including the filtered plurality of media subscription packages.

17. The method of claim 16, wherein the second data corresponds to a different format than the first data, the method further including converting the first data and the second data into a standard data format.

18. The computing system of claim 1, wherein the weighted values are higher for the first plurality of user activities than the second user activity.

* * * * *